(No Model.)

A. H. BERNSTEIN.
INCLOSING SEAL FOR PIPE JOINTS.

No. 565,874.　　　　　　　　　Patented Aug. 18, 1896.

Witnesses:
D. H. C. Tanner.
George L. Cragg

Inventor:
Adolph H. Bernstein
By Barton & Brown
Attorneys.

UNITED STATES PATENT OFFICE.

ADOLPH H. BERNSTEIN, OF CHICAGO, ILLINOIS.

INCLOSING SEAL FOR PIPE-JOINTS.

SPECIFICATION forming part of Letters Patent No. 565,874, dated August 18, 1896.

Application filed February 11, 1896. Serial No. 578,831. (No model.)

*To all whom it may concern:*

Be it known that I, ADOLPH H. BERNSTEIN, a citizen of the United States, residing at Chicago, in the county of Cook and State of Illinois, have invented a certain new and useful Improvement in Inclosing Seals for Pipe-Joints, (Case No. 1,) of which the following is a full, clear, concise, and exact description, reference being had to the accompanying drawings, forming a part of this specification.

My invention relates to means for protecting pipe unions and couplings from being disturbed or opened by those who are not authorized, and has for its object the provision of an improved form of seal for this purpose.

I will describe my invention in connection with the accompanying drawings, in which—

Figure 1:
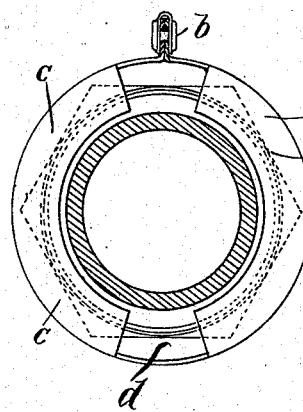
Figure 2:
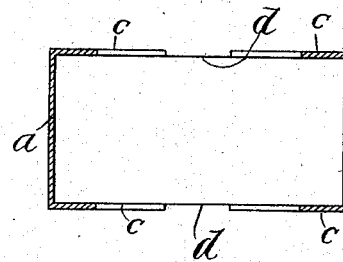

Figure 1 is a side view of my improved form of inclosing seal for pipe-joints, the pipe being indicated in cross-section. Fig. 2 is a sectional plan view of my improved form of seal, taken on a line through its center.

Like parts are indicated by similar letters of reference in both views.

A ring or band $a$ is employed, consisting of a single piece of spring metal or other suitable material, the ends whereof are adapted to be brought together and secured by a lock $b$, (which may be a rivet,) the ends being perforated for this purpose. This band is provided with flanges $c\,c$, which are formed integral with the band. The flanges are preferably notched at $d\,d$, so that the seal may be readily distended to permit of its disposal about the pipe-coupling. When rivets are employed, they should be constructed of soft metal, and the tool which is employed for compressing the same may be provided with suitable designating-characters, which may be impressed upon the rivet.

Heretofore seals of this character have been formed of two pieces of metal hinged together at a point diametrical to their free ends. The seals thus constructed are somewhat expensive and not very durable, especially when the seals are disposed in damp places, the hinge-joints being liable to rust. By my improved construction I am enabled to dispense with the employment of a hinge, thereby cheapening the construction and increasing the effectiveness of the device.

Having described my invention, what I claim as new, and desire to secure by Letters Patent, is—

1. A ring-shaped seal inclosing a pipe-coupling formed of a single piece of spring metal having inwardly-extending flanges formed integral with said seal, said flanges being partially cut away as shown, the free ends of said seal being united by a rivet of soft metal, substantially as and for the purpose described.

2. A seal adapted to inclose a pipe-coupling formed of a single piece of metal or other suitable material having inwardly-extending flanges formed integral therewith, said flanges being partially cut away as shown, the free ends of said seal being adapted to be united by a rivet of soft metal or other lock.

In witness whereof I hereunto subscribe my name this 8th day of February, A. D. 1896.

ADOLPH H. BERNSTEIN.

Witnesses:
CHAS. D. HASKINS,
GEORGE P. BARTON.